(12) United States Patent
Safran

(10) Patent No.: US 8,523,712 B2
(45) Date of Patent: Sep. 3, 2013

(54) TRAINING AND COORDINATION DEVICE

(76) Inventor: Jeremy A. Safran, Kaiku, HI (US)

( * ) Notice: Subject to any disclaimer, the term of this patent is extended or adjusted under 35 U.S.C. 154(b) by 21 days.

(21) Appl. No.: 13/033,889

(22) Filed: Feb. 24, 2011

(65) Prior Publication Data

US 2011/0143867 A1 Jun. 16, 2011

Related U.S. Application Data

(62) Division of application No. 12/388,396, filed on Feb. 18, 2009, now abandoned.

(51) Int. Cl.
*A63B 69/00* (2006.01)

(52) U.S. Cl.
USPC .............................. 473/423; 473/422; 473/430

(58) Field of Classification Search
USPC ................. 473/422, 423–430, 569, 442, 575, 473/576; 482/83, 86, 87, 148; D21/309; 273/333, 400
See application file for complete search history.

(56) References Cited

U.S. PATENT DOCUMENTS

| | | | |
|---|---|---|---|
| 660,787 A | 10/1900 | Bissell | |
| 773,167 A * | 10/1904 | Sprink | 273/333 |
| 810,613 A * | 1/1906 | Burke et al. | 446/415 |
| 811,546 A * | 2/1906 | Conroy | 482/86 |
| 1,694,044 A * | 12/1928 | Thompson | 482/87 |
| 1,782,254 A | 11/1930 | Breidenbach | |
| 2,186,016 A * | 1/1940 | Evans | 482/88 |
| 2,307,905 A | 1/1943 | Ament | |
| 2,496,795 A * | 2/1950 | Johnson | 473/575 |
| 2,634,977 A * | 4/1953 | Hunter | 473/108 |
| 3,147,979 A * | 9/1964 | Wolfe | 473/281 |
| 3,262,703 A * | 7/1966 | Hodlick | 473/474 |
| 3,332,686 A * | 7/1967 | Frost | 473/575 |
| 3,502,337 A * | 3/1970 | Butkus | 473/147 |
| 3,602,505 A * | 8/1971 | Friend | 473/470 |
| 3,776,551 A * | 12/1973 | Schaller et al. | 473/575 |
| 3,785,643 A * | 1/1974 | Rich | 482/86 |
| 3,819,183 A * | 6/1974 | Crowder | 273/331 |
| 3,953,029 A * | 4/1976 | Boyd | 473/575 |
| 4,003,572 A * | 1/1977 | Harvey | 473/429 |
| 4,077,624 A | 3/1978 | Feaser | |
| 4,124,207 A | 11/1978 | Breslow et al. | |
| 4,130,276 A | 12/1978 | Tricarico | |
| 4,177,995 A * | 12/1979 | Surland | 473/575 |

(Continued)

FOREIGN PATENT DOCUMENTS

DE 3821755 3/1989

OTHER PUBLICATIONS

Praktisac, "Champion Praktisac", martial arts training toy, game rules, Jun. 10, 2009.

*Primary Examiner* — Mitra Aryanpour
(74) *Attorney, Agent, or Firm* — Stephen C. Beuerle; Procopio Cory Hargreaves & Savitch LLP

(57) ABSTRACT

A training and coordination device including a projectile member such as a ball or sack secured to an elastic string is described. The first end of the elastic string is attached to a location and the second end is connected to the projectile member. At least an end portion of the elastic string secure to the projectile member comprises multiple strands of an odd number. The multiple strands of the elastic string in conjunction with the elasticity of the string generate a random motion of the sack when the sack moves relative to the string.

24 Claims, 15 Drawing Sheets

(56) References Cited

U.S. PATENT DOCUMENTS

| | | | | |
|---|---|---|---|---|
| 4,235,042 A * | 11/1980 | Hills | | 446/327 |
| 4,248,423 A * | 2/1981 | Lotfy | | 473/571 |
| 4,257,589 A * | 3/1981 | Outlaw | | 482/148 |
| 4,330,131 A * | 5/1982 | Warehime | | 473/575 |
| 4,534,557 A * | 8/1985 | Bigelow et al. | | 473/442 |
| 4,576,379 A * | 3/1986 | Juhasz | | 473/430 |
| 4,593,901 A | 6/1986 | Moore et al. | | |
| D287,390 S | 12/1986 | Charles et al. | | |
| 4,687,209 A | 8/1987 | Carey | | |
| 4,706,964 A * | 11/1987 | Genovese | | 473/575 |
| 4,712,510 A * | 12/1987 | Tae-Ho | | 119/708 |
| 4,721,302 A * | 1/1988 | Murphy | | 482/89 |
| 4,971,334 A | 11/1990 | Stewart | | |
| 5,060,946 A * | 10/1991 | Taylor | | 473/429 |
| 5,181,726 A | 1/1993 | Piaget | | |
| 5,238,241 A * | 8/1993 | Christensen | | 473/424 |
| 5,328,191 A | 7/1994 | Taylor, Jr. | | |
| 5,586,760 A | 12/1996 | Hauter | | |
| 5,674,157 A * | 10/1997 | Wilkinson | | 482/83 |
| 5,733,193 A * | 3/1998 | Allard et al. | | 463/8 |
| 5,772,542 A | 6/1998 | Gildea et al. | | |
| 5,823,537 A | 10/1998 | Blanton | | |
| D426,585 S | 6/2000 | Manniso | | |
| 6,302,814 B1 * | 10/2001 | Cade | | 473/594 |
| 6,334,821 B1 | 1/2002 | Kita | | |
| 6,478,699 B1 | 11/2002 | Fairweather | | |
| 6,544,099 B2 * | 4/2003 | Shafik | | 446/404 |
| 6,598,882 B2 | 7/2003 | Stubberfield | | |
| 6,740,012 B1 | 5/2004 | Olszewski | | |
| 6,872,171 B2 * | 3/2005 | Haselrig | | 482/83 |
| 6,994,642 B2 | 2/2006 | Gerak et al. | | |
| 7,115,052 B2 | 10/2006 | Wardle et al. | | |
| 7,198,579 B2 | 4/2007 | Moss et al. | | |
| 7,641,601 B2 | 1/2010 | Jaet | | |
| 7,850,535 B2 * | 12/2010 | Noble et al. | | 473/140 |
| 2002/0042330 A1 | 4/2002 | Pemjean | | |
| 2003/0224879 A1 | 12/2003 | Hansberry | | |
| 2004/0110607 A1 | 6/2004 | Crespo | | |
| 2004/0254036 A1 | 12/2004 | Smith | | |
| 2007/0161435 A1 | 7/2007 | Parkinson | | |
| 2009/0264264 A1 | 10/2009 | Reen | | |

* cited by examiner

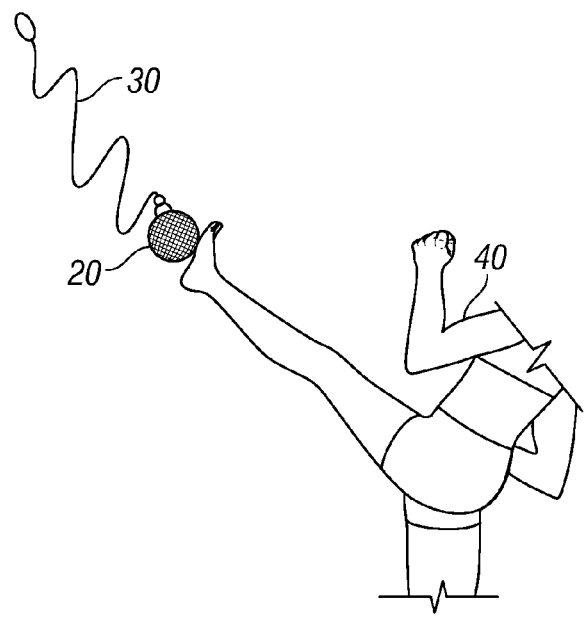
FIG. 8D
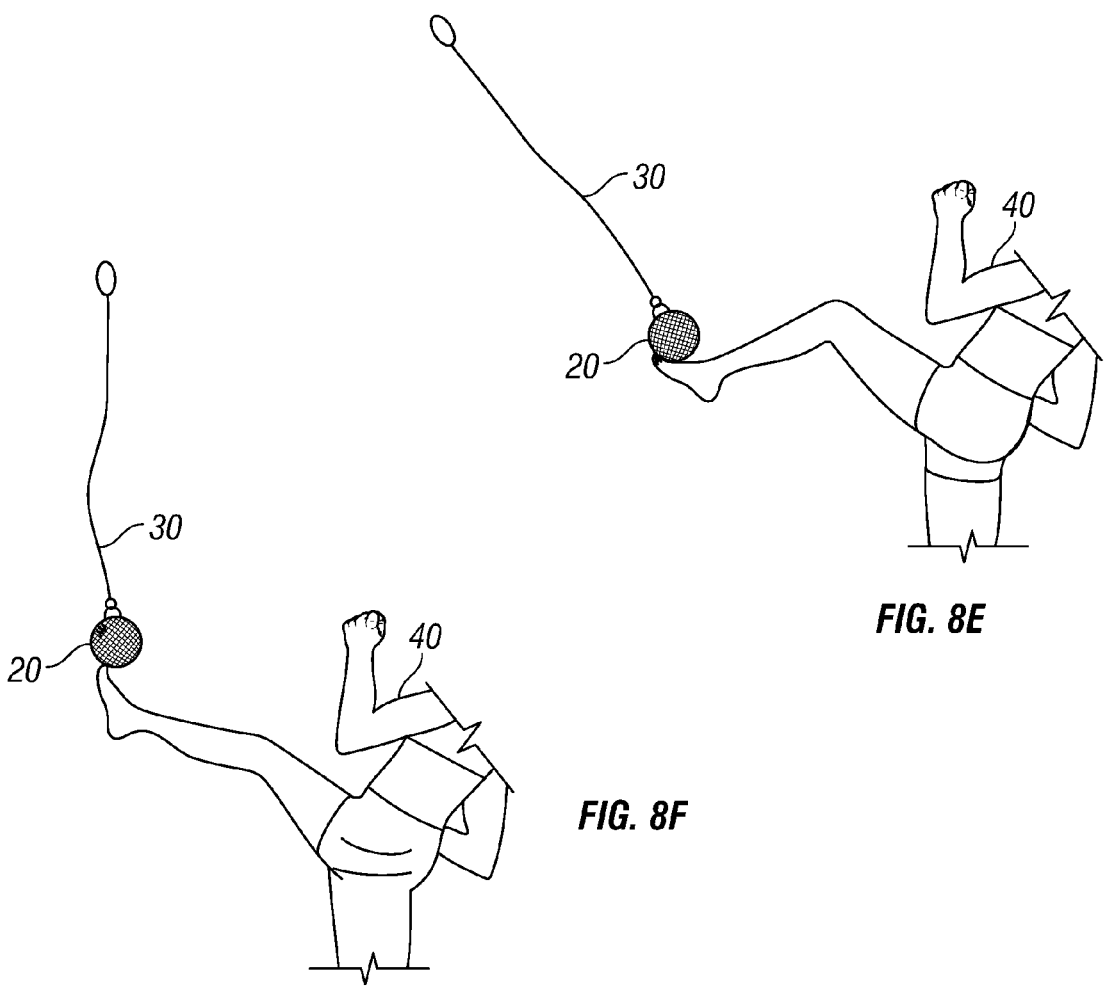
FIG. 8E
FIG. 8F

TRAINING AND COORDINATION DEVICE

FIELD OF THE INVENTION

This invention relates to generally to a training and coordination device and more particularly to a martial arts attack sack with multiple mechanical parts.

BACKGROUND OF THE INVENTION

In recent years the public has become increasingly aware of the importance of physical fitness. Concurrent with this trend is the increasing popularity and participation in the martial arts, such as karate. In the past training for sports such as martial arts, baseball or practicing for carnival games like bottle toss can be tedious or costly. Studying the martial arts requires extensive and constant exercising not only to learn the different movements but to develop coordination, various muscles and quick reflexes. While several devices have been developed and are currently on the market for use in physical development, such devices do little in aiding one in coordination and quickening his reflexes. Additionally the available devices are not cost effective, are very tedious to carry around and require additional exercises that make the study of the martial arts a difficult and laborious process. It would therefore be highly desirable to develop a cost effective, multifaceted training and coordination device.

SUMMARY

The present invention includes a training and coordination device and method of improving coordination of a user with the training and coordination device. In one embodiment, the training and coordination device comprises a projectile member and an elastic string. The projectile member may comprise a ball or a sack containing a filling. A loop is attached to a section of the projectile member. The elastic string has a length within the range of 4-15 feet and includes a first end and a second end. The first end may be attached to a fixed location or movably supported and the second end is connected to the loop portion of the projectile member or sack. At least a portion of the elastic string extending up to the second end comprises a multi-strand portion which may be formed by threading the second end of the string through the loop portion and looping it back on itself, knotting it together at a location spaced from the second end to leave a free end portion then attaching the free end portion to the loop to form three strands. Additional strands may be formed by threading back through the loop portion and re-knotting repeatedly until a desired number of strands (odd or even) are formed. In one embodiment, an odd number of strands are provided. The multi-strand portion may alternatively be formed by a plurality of separate strands knotted to the end of the string. The knots and multi-strand portion of the elastic string in conjunction with the elasticity of the string generate a random motion of the sack when the sack moves relative to the string.

In some embodiments, a method for improving coordination skills of a user with the training and coordination device is described. The method can be implemented as a game or as a training tool. The method starts with a user making a first contact with the training and coordination device. As previously described, the training and coordination device includes a projectile member such as a sack or ball and an elastic string. Making contact with the training and coordination device includes making contact with the sack. The sack is set into a random motion due to the first contact made by the user. The multiple strand end portion and knots of the string in conjunction with the elasticity of the string generate a random motion of the sack when the sack moves relative to the string. Finally, the user moves to make further contact with the sack as it moves away from the point of the first contact where the further contact is made prior to the sack returning to a rest position.

In yet another embodiment, a method for improving coordination skills of a user with the training and coordination device is described. The method can be implemented as a game or as a training tool. The method starts with a plurality of users assembling around the training and coordination device where the training and coordination device includes a sack and a string. A user of a plurality of users makes a first contact with training and coordination device using at least one allowable predetermined body part and avoiding contact with other body parts. The sack is set into a random motion due to the first contact made by the user. Any of the plurality of users makes contact with the training and coordination device with at least one allowable predetermined body part.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The invention is directed to a training and coordination device and methods of improving the coordination of a user. After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

In the past training for sports such as martial arts, baseball or practicing for carnival games like bottle toss can be tedious or costly. The training and coordination device described herein is a cost effective training device that can be interacted within a single spot and without having to constantly retrieve the training and coordination device. For martial arts training this combines a speed bag sack with a new random factor that keeps you guessing and provides more realistic training. The training and coordination device is small, elastic and hangs from a fixed location such as a ceiling or a tree. The training and coordination device improves martial arts skills by allowing players to practice their skills with full force and little to no risk of damaging themselves or others in the process of practice. The training and coordination device improves upon an ancient version which was a small rock hanging from a piece of silk. The ancient training device of the Shaolin Temple was static not dynamic and was hard on the body, whereas the training and coordination device described herein is active and easy on the hands.

Figure 1:
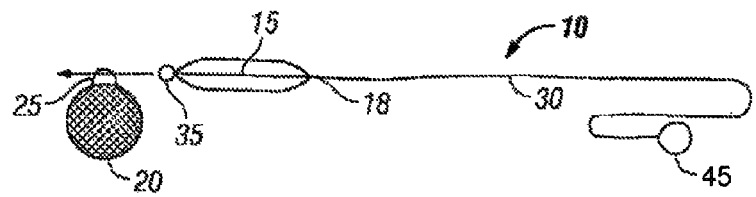
FIG. 1 is an example illustration of the unassembled components of one embodiment of the training and coordination device.

FIG. 1 is an example illustration of one embodiment of the unassembled components of the training and coordination device 10. In some embodiments the training and coordination device can be implemented for use in a game or for training purposes. The training and coordination device 10 includes a projectile member 20 which may be a ball, a sack, a bean bag, or the like and a string 30 such as an elastic string. The projectile member 20 may be a sack or enclosure filled with a suitable filling material, as illustrated in the drawings, or may be any type of ball or other projectile member suitable for impact or throwing by a user. In one embodiment, the projectile member 20 is a sack composed of cloth or woven material but other materials may be used in alternative embodiment such as synthetic fabric materials, plastic, leather, or the like. In one embodiment, the sack comprises an outer portion or enclosure containing a stuffing. The stuffing may be composed of seeds, beans, small plastic pellets and small wooden pellets, for example. In one embodiment, a small loop 25 of string, elastic or other suitable material, for example, is attached to the projectile member 20 for engaging the string 30. The small loop 25 of string or elastic can be sewn to the outer portion of the projectile member 20 (e.g., sack). In some embodiments at least a portion of the projectile member 20 is reinforced, with the small loop 25 of string, elastic or other suitable material attached to the reinforced portion.

The string 30 can be made of various materials including polyester, rubber and elastic. In some embodiments, the string 30 is non-elastic. The elastic string creates bounce and adds to the movement towards and away from a user 40. In some embodiments, the length of the string 30 is within the range of 4 to 15 feet. The length of the string 30 can vary according to the circumstances for which the string 30 is used. For example, the length of the string 30 can be longer to accommodate multiple users or for attaching to a high ceiling and/or tree. The string 30 includes a first end and a second end. The first end is attached to the fixed location such as a ceiling or a tree. In some embodiments, the training and coordination device 10 can be attached to a mobile location to further enhance the coordination skills of a user 40. A location loop 45 such as a small loop of string, elastic or other suitable material may be attached to the first end for engaging the fixed or mobile location.

Figure 2:
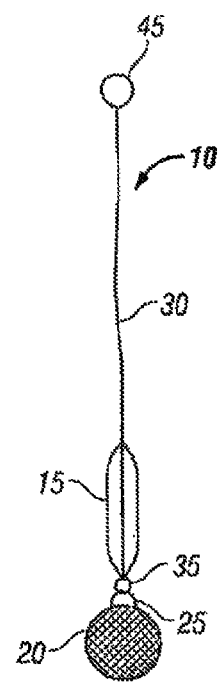
FIG. 2 is an example illustration of the assembled components of the training and coordination device of FIG. 1 in a rest position.

The second end of the training and coordination device 10 is attached directly or indirectly to the projectile member 20 (e.g., sack) via the small loop 25 of string or elastic, for example. A string loop 35 such as a small loop of string, elastic or other suitable material may be attached to the second end for engaging the projectile member 20. The string 30 includes a single, uninterrupted strand extending from the first end attached to the location loop 45 towards the second end, and a multiple strand portion 15 which extends from the single, uninterrupted strand up to the second end of the string and is attached to the small loop 25, as best illustrated in FIG. 2. In one embodiment, multiple strand portion 15 is attached to string loop 35 which in turn is attached to small loop 25 as illustrated in FIG. 2. The multiple strands may comprise separate strands which are each knotted at one end to the remainder of the string at junction 18 and knotted to string loop 35 or directly to small loop 25 at the other end. Alternatively, the multiple strands may be formed by threading a length of the string 30 through small loop 25, bending the length of the string back on itself and knotting it at junction 18 to leave a free end, bending the free end back again and either securing it to the small loop 25 or threading it through the small loop 25 and re-knotting it at junction 18 to form additional separate strands. The latter arrangement adds further random motion to the path of the projectile member 20 when struck or thrown. In some embodiments, the string 30 is threaded through the small loop 25 and rethreaded through its own end. The knotting and multi-strand end portion 15 creates randomness and unique reactions when contact is made with the training and coordination device 10. In some embodiments, only an end portion 15 of the string 30 is knotted or arranged to form multiple strands, while in others the entire string may be multiple strands. In our embodiment, the multi strand portion 15 is about one to two feet in length. There may be an odd number of strands in end portion 15 as illustrated while in other embodiments there is an even number of strands. The odd or even number of strings at the second end where the string 30 engages the projectile member 20 makes the projectile member 20 move in an unpredictable way. The elasticity of the string 30 causes the projectile member 20 to move away from a current position in, for example recoil motion, when contact is made with the projectile member 20, thereby contributing to the randomness or unpredictability of the projectile member 20 movement.

FIG. 2 is an example illustration of the assembled components of the training and coordination device 10 in a rest position. In the assembled state, the training and coordination device 10 includes the projectile member 20 (e.g., sack) coupled to the second end of the string 30 via the small loop 25 of string. In the rest position as illustrated in FIG. 2, the training and coordination device 10 is in a substantially vertical position with the first end of the string 30 hanging from a fixed or mobile location, for example, and the projectile member 20 hanging from the second end of the string 30. The training and coordination device 10 is configured to return to its rest position after contact is made with the training and coordination device 10.

Figure 3:
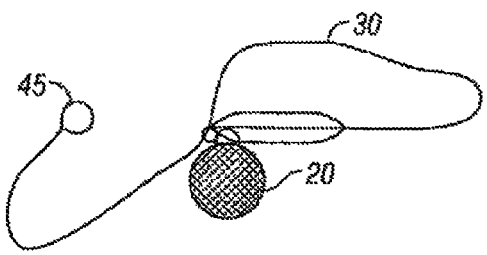
FIG. 3 is an example illustration of the assembled components of the training and coordination device in an active position.

FIG. 3 is an example illustration of the assembled components of the training and coordination device 10 in an active position. The training and coordination device 10 is in an active state when a user 40, for example, makes contact with it. Making contact with the training and coordination device 10 generally includes kicking, punching, slapping or throwing the projectile member 20 (e.g., sack) of the training and coordination thereby setting it off on a random motion as illustrated in FIG. 3, and causing the string 30 to spiral randomly. In the active position the projectile member 20 continues to move rapidly and randomly and eventually settles in a rest position if no further contact is made.

Figure 4:
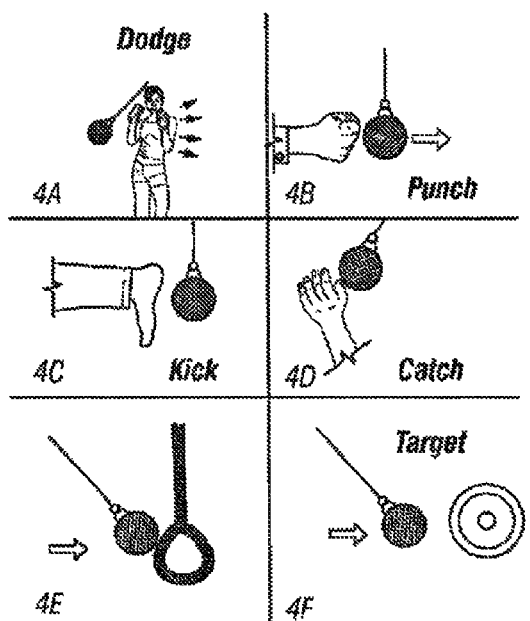
FIGS. 4A through 4F are example illustrations of making contact, avoiding contact and targeting functions of the training and coordination device.

FIGS. 4A through 4F are example illustrations of making contact, avoiding contact and targeting functions of the training and coordination device. FIG. 4A illustrates a user 40 avoiding contact or dodging the projectile member 20 (e.g., sack) when the training and coordination device. In one implementation the user 40 dodges the projectile member 20 to avoid contact with the rapidly and randomly moving projectile member 20 to improve coordination or to avoid negative points in a game. In one embodiment the user 40 avoids contact with the projectile member 20 after making contact with the projectile member 20 or after a different user 40 makes contact with the projectile member 20. A user 40 may be eliminated from training or a game when the user 40 exceeds a threshold of negative points. FIG. 4B illustrates a user 40 making contact with the projectile member 20 by punching the projectile member 20. In other embodiments the user 40 can make contact with the projectile member 20 by kicking the projectile member 20 or catching the projectile member 20 as illustrated in FIGS. 4C and 4D respectively. The training and coordination device 10 can be utilized for training exercise and games. In one embodiment, a game implementation involves users 40 making contact or avoiding contact with the ball in an attempt to influence the balls movement in order to create a result (game play) or train a skill (martial arts games such as kung fu games). Some of the simplest games include a "single user toss" or "solo toss." In this implementation the single user 40 stands directly below where the training and coordination device is affixed to the ceiling, for example, and throws the projectile member 20 away from the user 40. The projectile member 20 returns rapidly and randomly and the player catches the projectile member 20 and throws the projectile member 20 again. In other embodiments, the projectile member 20 is tossed toward a target. In this implementation a target point is selected or a target point is elected or hung on a wall. Examples of the targets are illustrated in FIGS. 4E and 4F. In FIG. 4E the projectile member 20 is propelled toward a target hole formed by a rope and in FIG. 4F a target spot is implemented on a wall or a piece of paper. In some embodiments, if the user 40 misses the target, they may take one or more steps forwards or backwards making aiming or throwing of the projectile member 20 towards the target harder or easier. In other embodiments, the user 40 is blindfolded or has their eyes closed during a game or training session. In one embodiment, a game or training session can be initiated by serving the training and coordination device including making contact with the projectile member 20 in a predefined routine, such contacting the projectile member 20 with the sole of the foot. In some embodiments, the device 10 may be used in a game or training session with multiple participants or users. In one example, one of the participants stands facing into a circle formed by the participants around the training and coordination device and throws the projectile member 20 over their shoulder and out of the circle whereupon game play starts when a different user or participant 40 makes contact with the projectile member 20.

Figure 5:
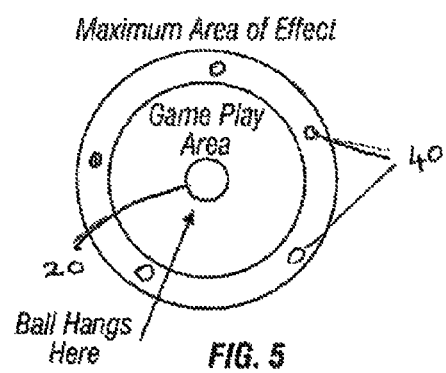
FIG. 5 illustrates an example of a designated area for interacting with the training and coordination device.

FIG. 5 illustrates an example of a designated area for interacting with the training and coordination device. The game play circle of this illustration includes a game play area with an inner circle that users 40 can surround and an outer circle indicating the maximum area for implementing the game. In some embodiments, the total length of the string 30 determines the size of the inner and outer circle and subsequently determines the maximum number of users per game. The number of users can be as many as would fit in the game play circle. In some embodiments the user 40 makes contact with the projectile member 20 (e.g., sack) while outside and/or inside the circumference of the game play circle.

Figure 6:
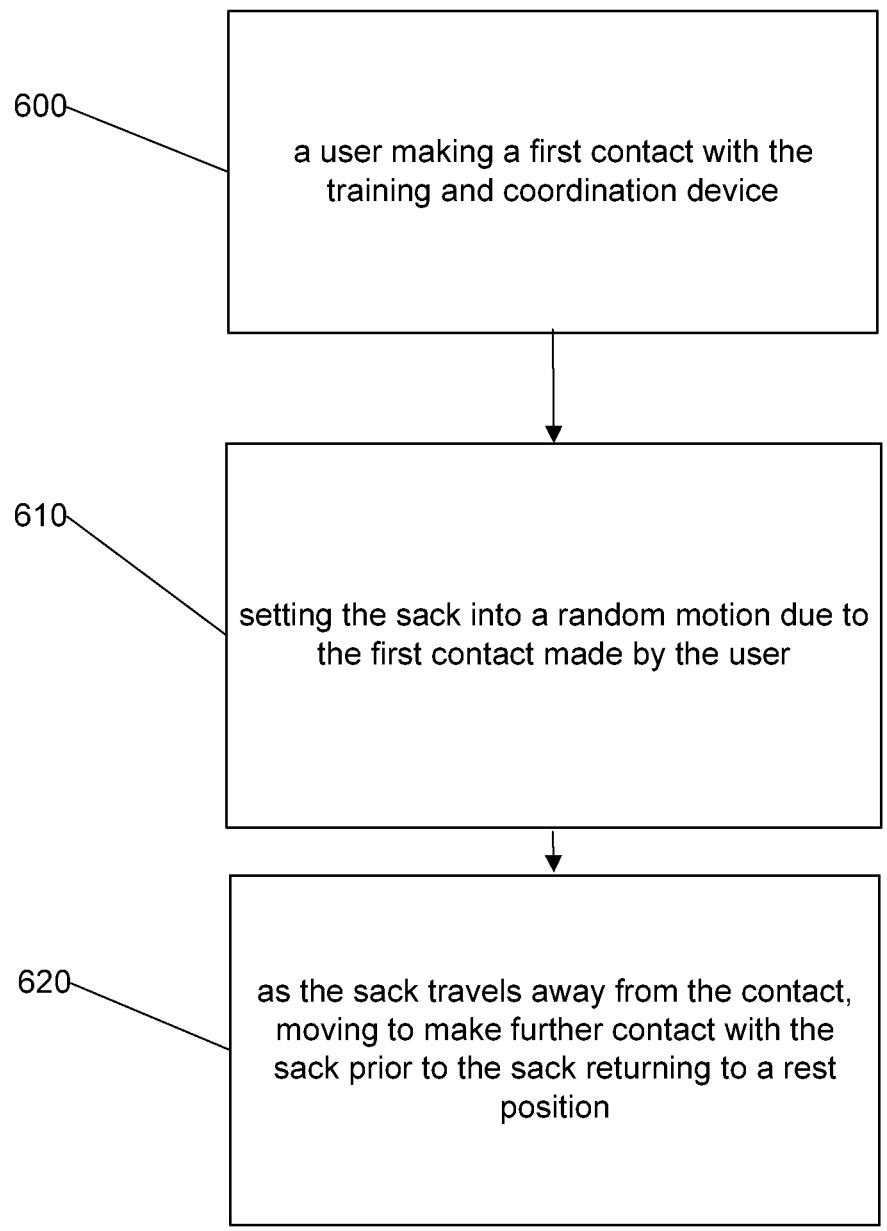
FIG. 6 is a flow chart of an exemplary method for improving coordination skills of a user with the training and coordination device.

FIG. 6 is a flow chart of an exemplary method for improving coordination skills of a user 40 with the training and coordination device. The method can be implemented as a game or as a training tool. At block 600 the method starts with a user 40 making a first contact with the training and coordination device 10 including a projectile member 20 (e.g., sack) and a string 30 (e.g., elastic string). Making contact with the training and coordination device 10 includes making contact with the projectile member 20. When the user makes contact with the projectile member 20, the elasticity of the string 30 in conjunction with the multiple strand end portion 15 generate a random motion of the projectile member 20 when the projectile member 20 moves relative to the string 30. The process then continues to block 610 where the projectile member 20 is set into a random motion due to the first contact made by the user 40. Finally at block 620, the user 40 moves to make further contact with the projectile member 20 as it moves away from the point of the first contact where the further contact is made prior to the projectile member 20 returning to a rest position. In general making contact with the projectile member 20 includes tossing the projectile member 20, tossing the projectile member 20 toward a specific target, catching the projectile member 20, punching the projectile member 20, kicking the projectile member 20, blocking the projectile member 20, striking the projectile member 20, tagging the projectile member 20, serving the projectile member 20 and hitting the projectile member 20. These skills allow users to overcome other users' defenses and advance the user's martial arts skills. In some embodiments the user 40 takes one or more steps forward to make a first or second contact with the projectile member 20. In some embodiments, the user 40 makes a contact with the projectile member 20 and follows up with subsequent contacts as the ball moves away from the user 40. The user 40 can continue to make contact with the projectile member 20 while staying put or moving forward until the user 40 cannot make contact with the projectile member 20 or maintain a realistic distance from the rest position of the training and coordination device, for example. In some embodiments, the user 40 is situated at a point on the outside of the game play circle or at any point on the circle where the user 40 can reach the projectile member 20. The user makes contact with the projectile member 20 and attempts to avoid being hit by the sack's recoil while keeping the projectile member 20 in front of the user 40. In other embodiments, making contact with the training and coordination device using open hands is prohibited.

Other specific games or training implementations with the attack sack include the following.

Dodge:

In this implementation, a player stands directly under the ball, throws the ball away from his or her current position and avoid or attempt to avoid being hit by the ball.

Dodge Advanced:

In this implementation a player stands directly underneath a rest position or underneath the point where the ball is attached and throws the ball behind them and attempt to avoid being hit by the ball.

Ninja Dodge (Jedi Dodge):

In this implementation, the player stands directly underneath a rest position or underneath the point where the ball is attached and with the players eyes closed, throws the ball away from his or her current position and attempt to avoid being hit by the ball.

Punch Basic:

Standing directly underneath a rest position or underneath the point where the ball is attached a player punches the ball and makes contact or attempt to make contact with the ball every time the ball returns while avoiding being hit by the ball. Various types of punches or kicks can be used to make contact with the ball. For example, karate postures, kung fu postures, boxing postures, round house punches, jabs, and hooks.

Punch Forward:

A player begins by standing directly underneath a rest position or underneath the point where the ball is attached and starts to lightly punch the ball. As the ball extends away from the player the player steps forward and attempt to keep the ball in front of the player the entire time.

Roving Punch:

In this implementation, a player begins by punching the ball and then chases the ball or attempt to chase the ball around the room. The goal is to hit the ball as frequently as possible.

Shaolin Punch (5 Animal Punch):

In this implementation, a player begins by punching or tossing the ball to initiate the swinging of the ball. Using the concept of roving punch, the player tracks and targets the ball using contact postures such as shaolin animal fists to make contact with the ball. Other examples of contact postures include, crane's beak, drunken fist, tiger claw, mantis fist, monkey's paw, dragon claw and leopard paw.

Kick it:

In this implementation, a player begins by kicking the ball and continues to use foot movements to hit the ball and avoid being tagged (i.e. avoid having the ball making contact with a set of predetermined parts of the players' body)

Toss and Catch:

In this implementation, a player stands directly underneath a rest position or underneath the point where the ball is attached and throws the ball away from the player and catch or attempt to catch the ball on its rebound.

Target Toss:

In this implementation, the player stands directly underneath a rest position or underneath the point where the ball is attached and throws the ball away from the player and attempt to tag a specific spot or mark on a wall or tree and catch the ball on its rebound.

Other specific games or training implementations with the attack sack include multi player games such as the "Attack Sack Sparring or Competition Attack Sack." In this implementation, the players stand in a circle or opposite each other (within a play area or court) surrounding the ball. Contact is made with the ball by punching or kicking the ball towards the other players. Making contact with the ball in some predetermined body parts of a player is considered safe. For example, the fingertips up to and including the elbows and tips of toes up to and including the knees are "armored" or safe areas that don't constitute a tag if you are contacted or "hit" or "tagged" by the ball. Any other area of the body that is hit by the ball is a tag. In some implementations the players only move one space in the circle to the right. The game can be initiated with each player having a number of points. Each time the player is hit or tagged the points are reduced accordingly until the player is out of points and subsequently out of the game. Players continue to circulate the court on each occurrence of a tag. Players may move about (though not too far out of their play area) and can use any technique of kicking and punching. Some competition games or rounds of the game (a series of game play ending in someone getting tagged) are limited to only kicking or only crane style or elbows only.

Figure 7:
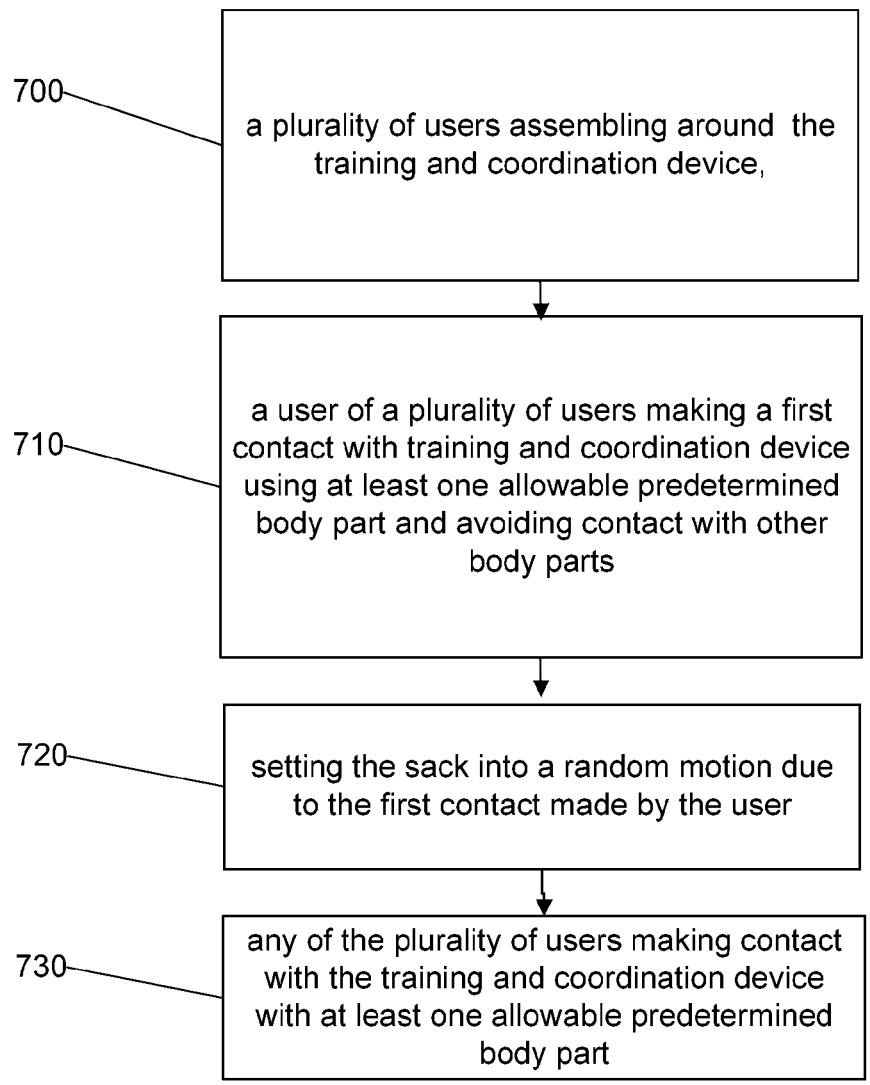
FIG. 7 is another flow chart of an exemplary method for improving coordination skills of a user with the training and coordination device.

FIG. 7 is another flow chart of an exemplary method for improving coordination skills of multiple users 40 with the training and coordination device. The method can be implemented as a game or as a training tool. At block 700 the method starts with a plurality of users assembling around the training and coordination device 10. The method then continues to block 710 where a user 40 of a plurality of users makes a first contact with the projectile member 20 (e.g., sack) at the end of training and coordination device using at least one allowable predetermined body part and avoiding contact with other body parts. At block 720, the projectile member 20 is set into a random motion due to the first contact made by the user 40. Finally at block 730 any of the plurality of users makes contact with the training and coordination device with at least one allowable predetermined body part. In some embodiments, making contact with the projectile member with any body part other than an allowable body part comprises an illegal contact for the game, and accounts for a score against the user 40. In some embodiments, the training and coordination device 10 can be served by the last user 40 who made an illegal contact with the training and coordination device 10 using the wrong body part. In some embodiments, multiple body parts are allowed for contract. The allowable predetermined body part may include parts of the user's 40 body from the fingertips to the elbows and from the knees to the toes. These parts of the user's 40 body can be used to make contact with the projectile member 20. All other parts of the user's 40 body are predetermined avoidable or illegal body parts, i.e. non-allowed body parts. In other embodiments, a user 40 may not receive a negative score if hit by the projectile member 20 after making the initial contact with the projectile member 20 or after the projectile member 20 is contacted by the string 30. On the other hand, a user 40 may receive a negative score if hit by the projectile member 20 after a different user 40 makes contact with the projectile member 20. In some embodiments, when a user 40 makes contact with the training and coordination device using the wrong or non-allowed body part, the plurality of users move in a predetermined direction. The predetermined direction is one of a clockwise and counterclockwise direction.

Figure 8A:
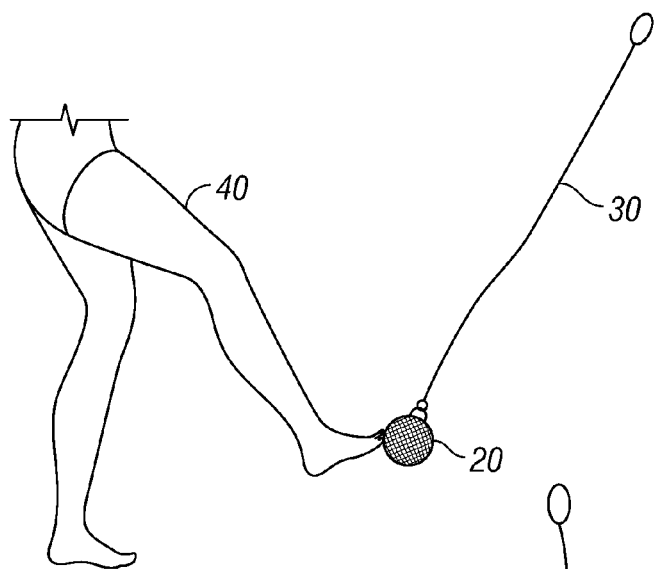
FIGS. 8A through 8Z include example illustrations of the multiple martial arts maneuvers for making contact with the training and coordination device.
Figure 8B:
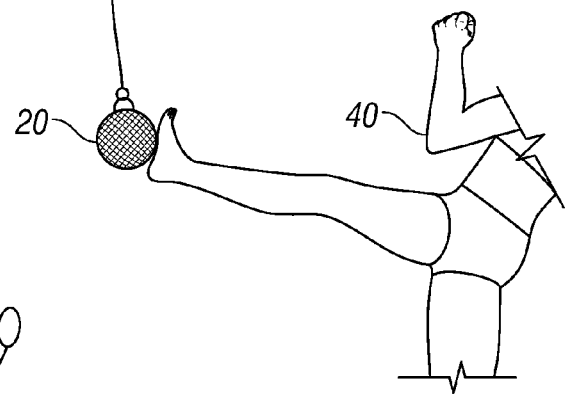
Figure 8C:
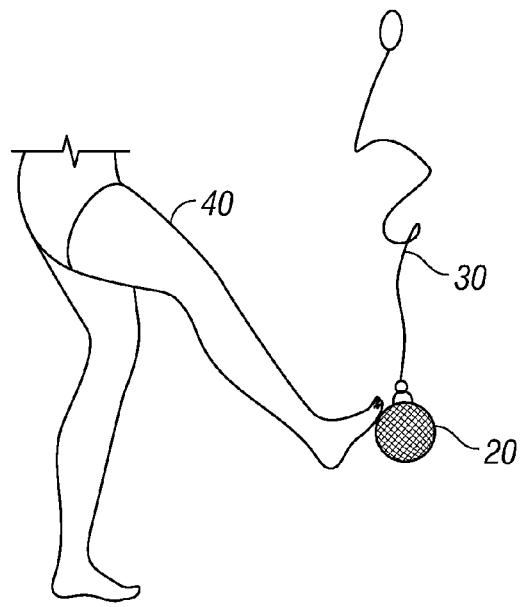
Figure 8G:
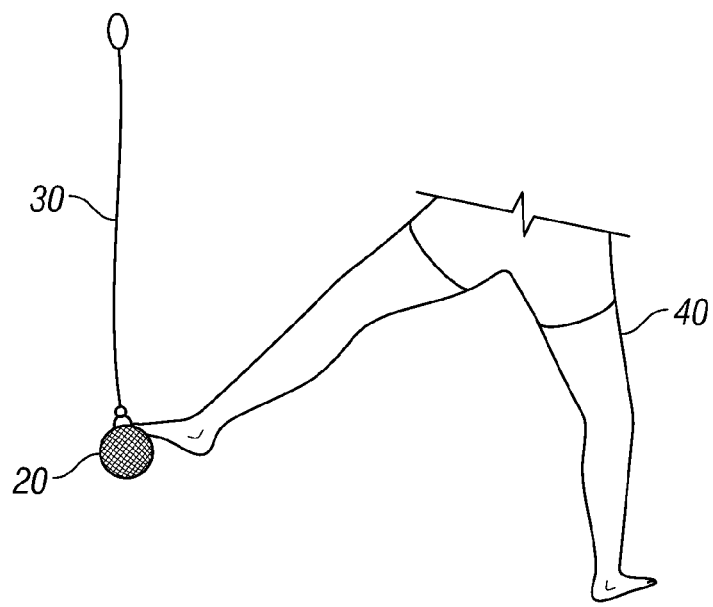
Figure 8H:
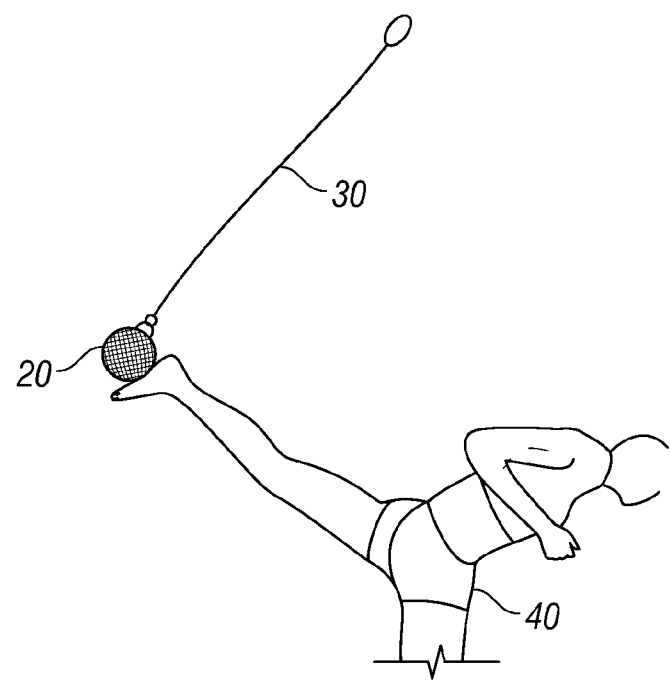
Figure 8I:
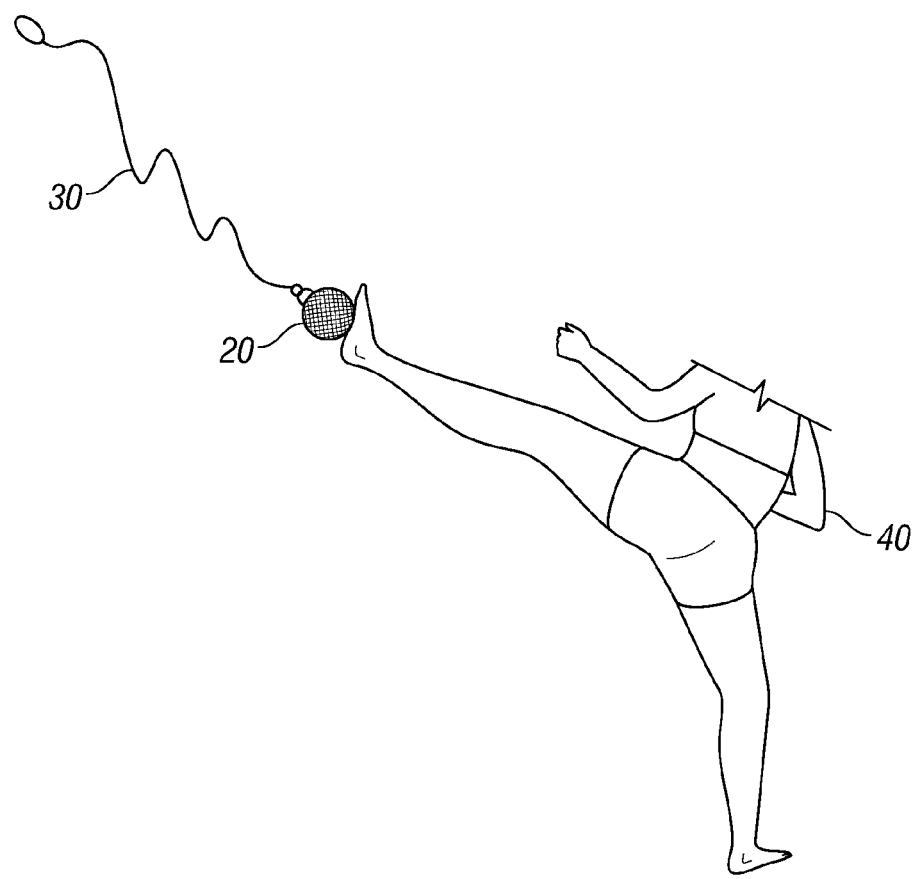
Figure 8J:
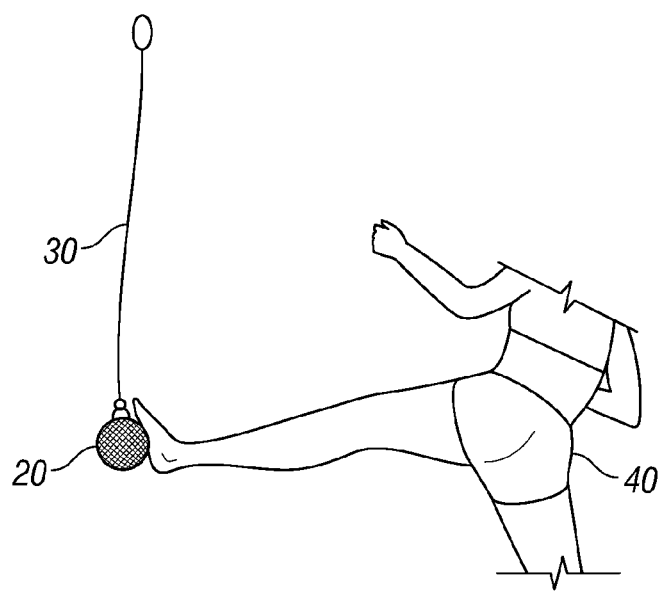
Figure 8K:
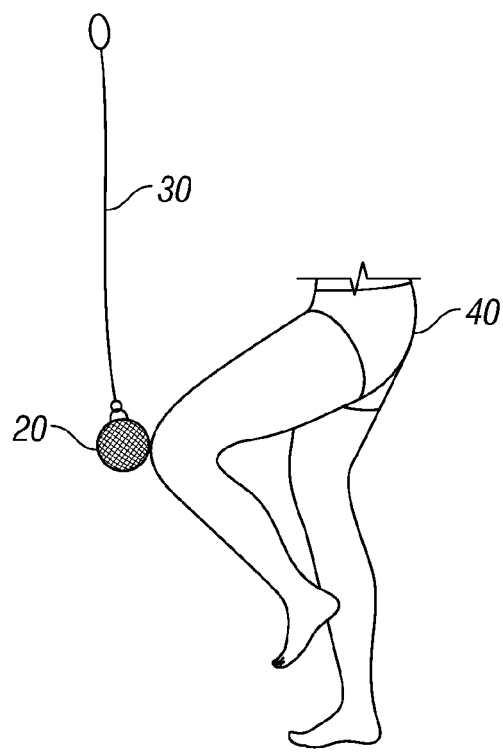
Figure 8L:
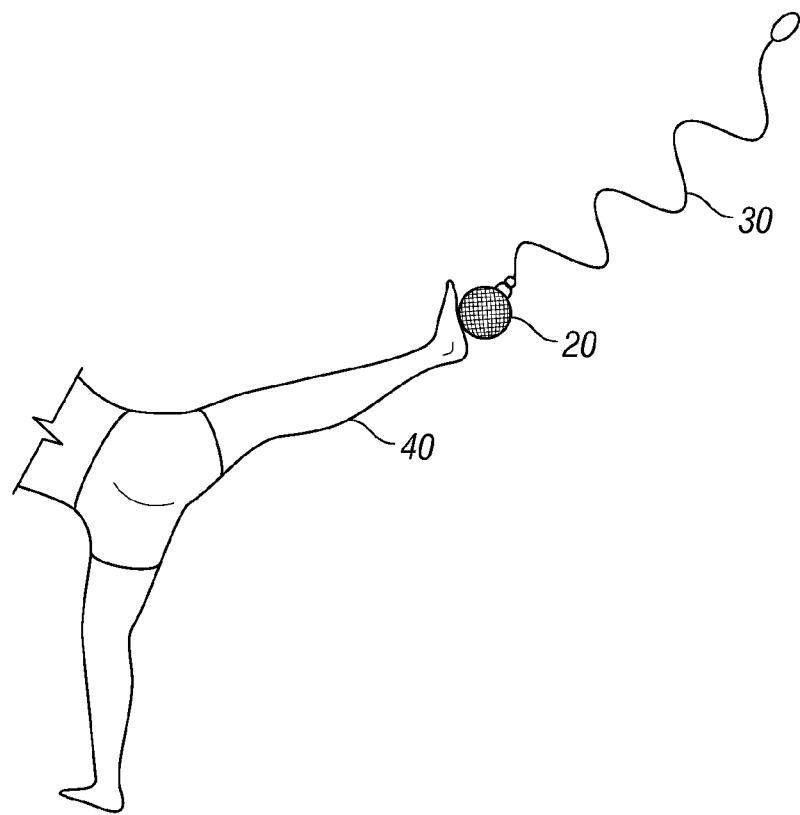
Figure 8M:
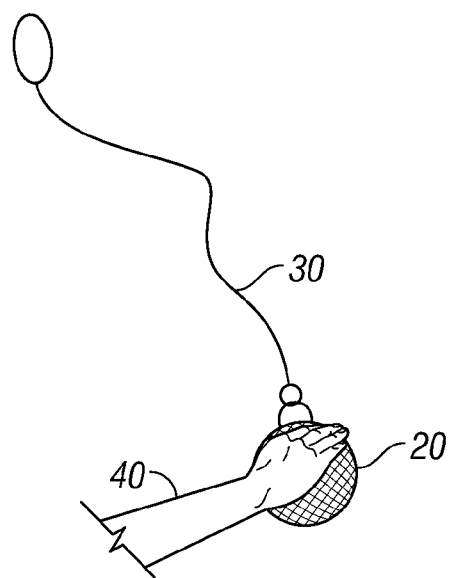
Figure 8N:
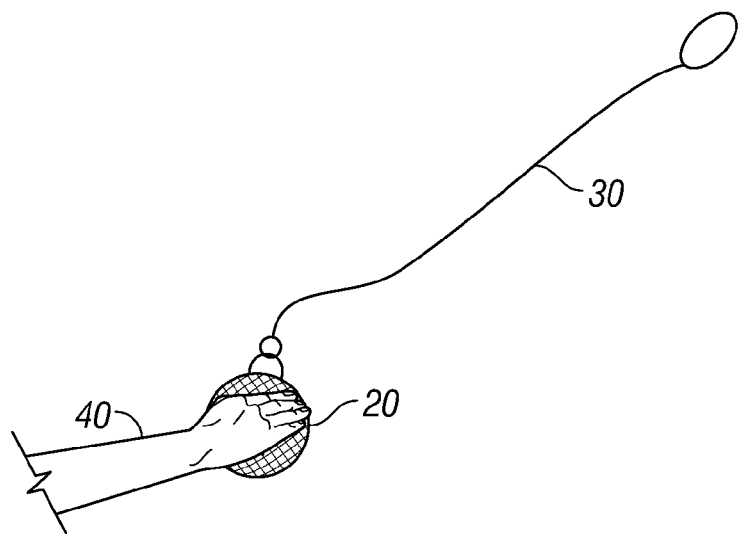
Figure 8O:
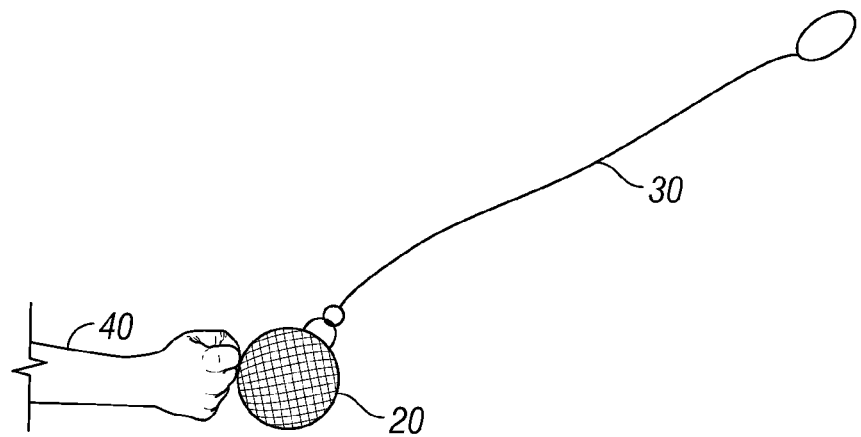
Figure 8P:
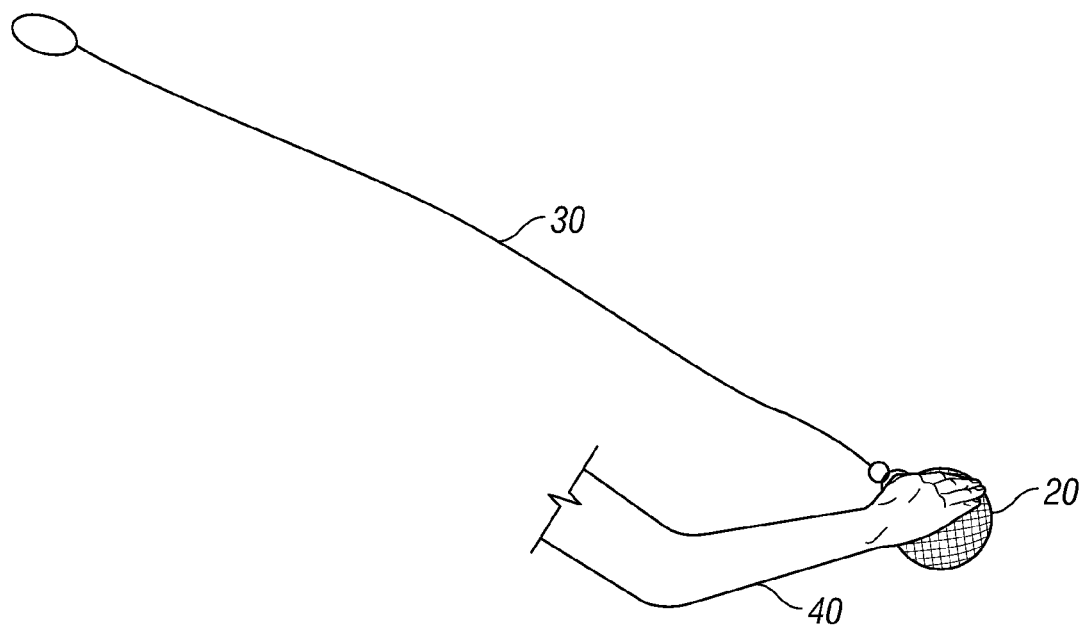
Figure 8Q:
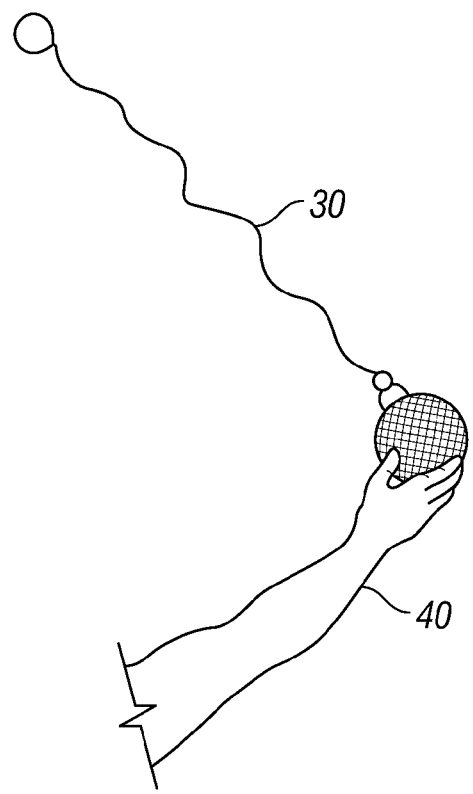
Figure 8R:
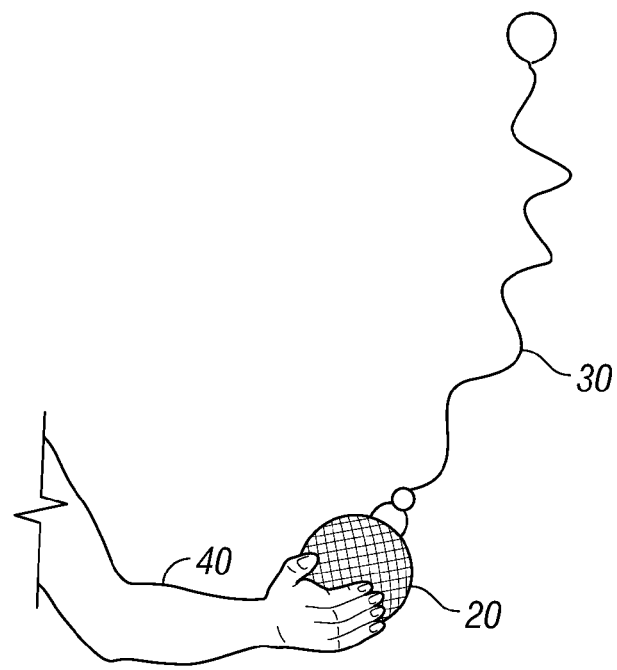
Figure 8S:
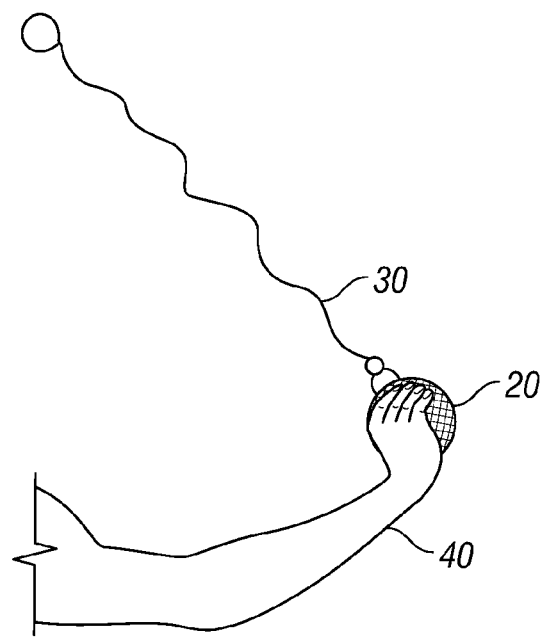
Figure 8T:
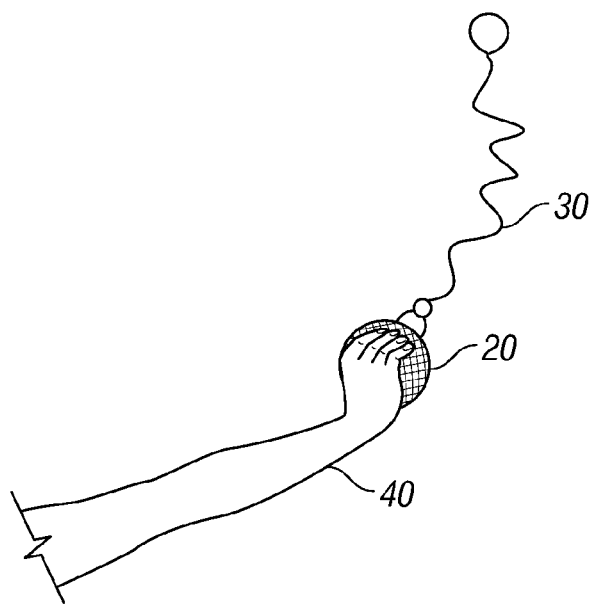
Figure 8U:
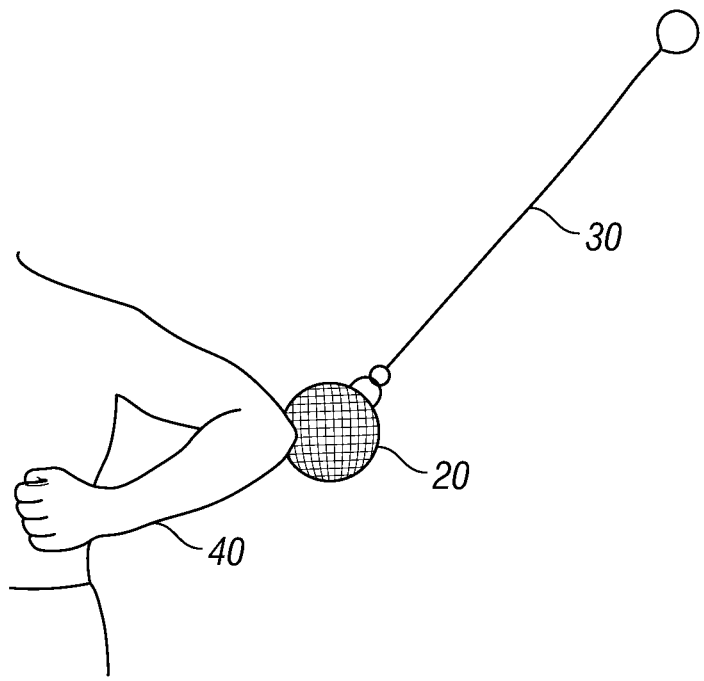
Figure 8V:
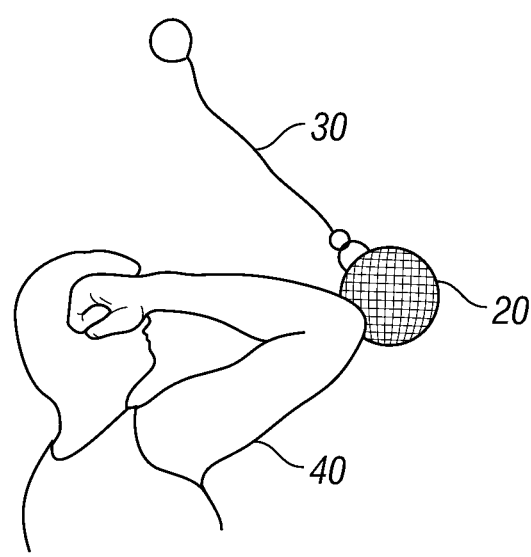
Figure 8W:
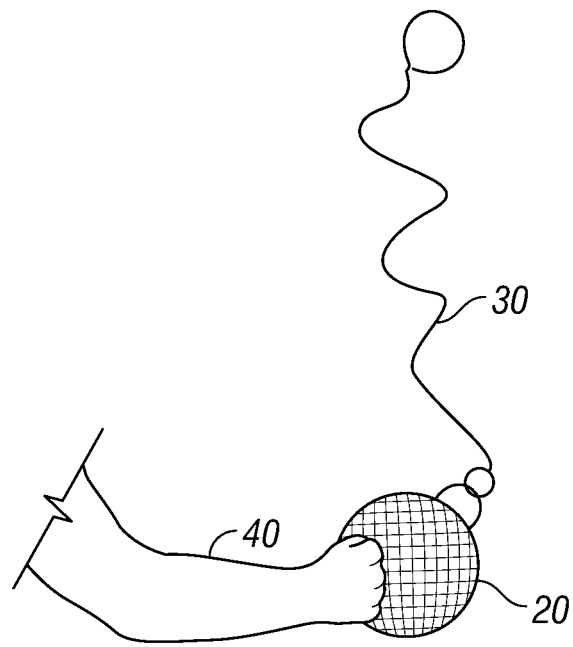
Figure 8X:
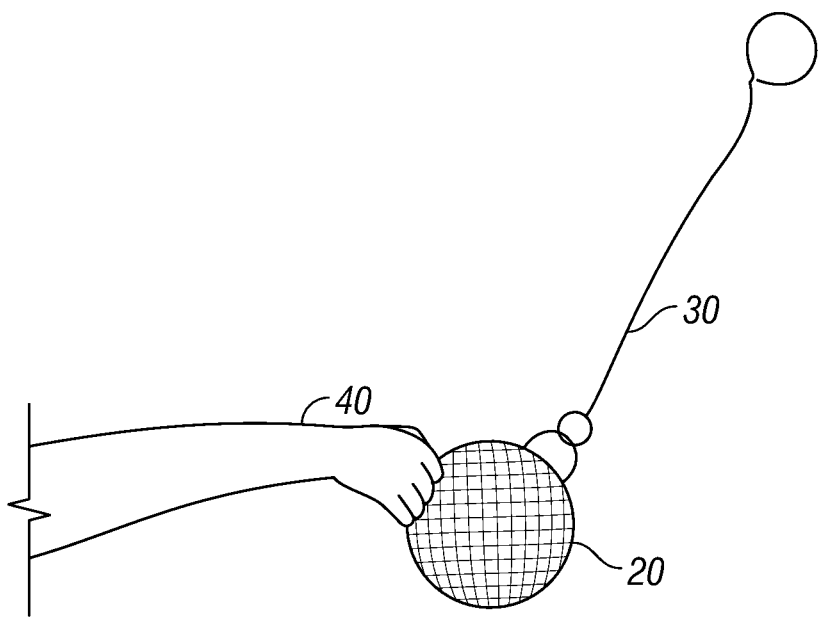
Figure 8Y:
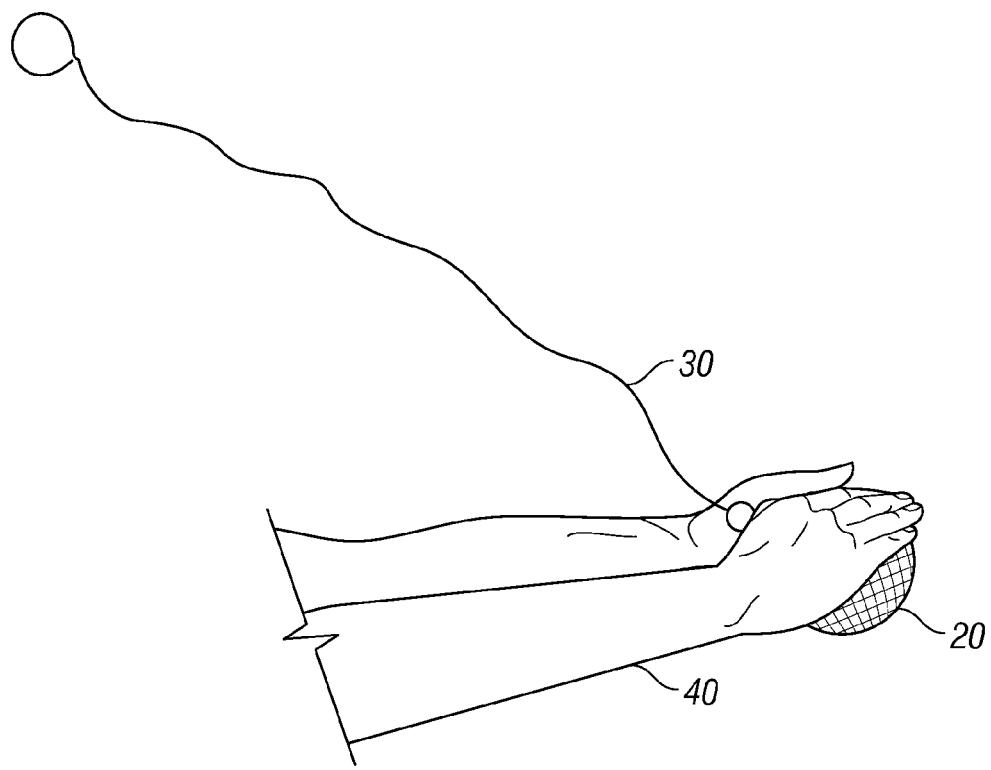
Figure 8Z:
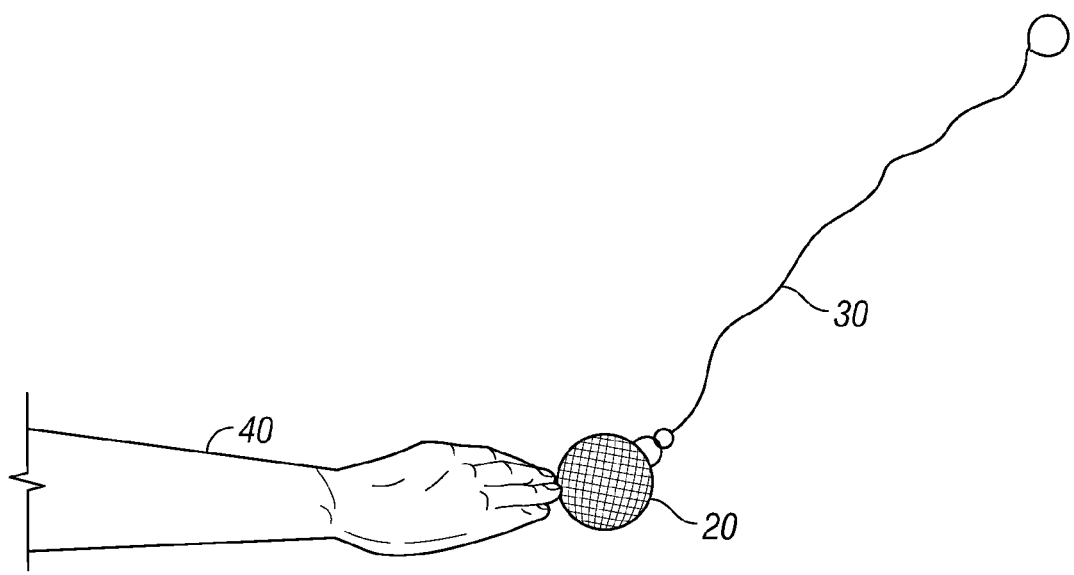

FIGS. 8A through 8Z include example illustrations of the multiple martial arts maneuvers for making contact with the training and coordination device. The maneuvers require making contact with different parts of the user's 40 body while the user 40 is positioned in a different martial arts stance. For example, FIG. 8A the user 40 makes contact with the projectile member 20 (e.g., sack) with a front snap to the shin maneuver. FIG. 8B illustrates a front snap to the lower back maneuver. FIG. 8C illustrates a front heel kick to the shin maneuver. FIG. 8D illustrates a front snap with the heel to the chin maneuver and FIG. 8E illustrates a front snap to the ribs maneuver. Some of the martial maneuvers include crane's beak, tiger's claw, sword hand, roundhouse kick, snap kick, long legged kick.

Skilled persons can implement the described functionality in varying ways for each particular application, but such implementation decisions should not be interpreted as causing a departure from the scope of the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A method for improving coordination of a user using a training and coordination device, the method comprising the steps of:
providing a string formed of a first section and a second section having first and second ends respectively;
the first end of said first section associated with a first end of said string, and the second end of said first section terminating at a predetermined point spaced from the second end of said second section, said first section being formed of a single, uninterrupted strand portion having elasticity;
the second end of said second section associated with a second end of said string, said second section including a multi-strand portion, said multi-strand portion including at least three separate strands and having a length of about one to two feet, said first end of said multi-strand portion attaching to said second end of said single, uninterrupted strand portion;
attaching said first end of said string to a fixed location;
attaching said second end of said string to a projectile member;
freely suspending said projectile member from said fixed location;
positioning the user at a selected first position on a support surface;
said user making a first contact with said freely suspended projectile member, thereby randomly moving said projectile member with respect to said user, wherein said elasticity of said single strand portion and said at least three separate strands of said multi-strand portion, produce said random motion in said projectile member;
moving said user from said first selected position to a second position; and
said user making a further contact with said projectile member prior to said projectile member returning to a rest position.

2. The method of claim 1, wherein making the first contact with the projectile member includes tossing the projectile member.

3. The method of claim 2, wherein tossing the projectile member comprises tossing the projectile member toward a specific target.

4. The method of claim 1, wherein the moving said user from said first selected position to said second position comprises taking one or more steps forward and making a second contact with the projectile member.

5. The method of claim 1, wherein making the further contact comprises catching the projectile member.

6. The method of claim 1, wherein the selected first position of the user before making a first contact with the projectile member is directly below the fixed location at which the first end of said string is attached.

7. The method of claim 1, wherein making the first contact with the projectile member comprises punching the projectile member.

8. The method of claim 7, wherein the user makes contact with the projectile member and follows up with subsequent contacts as the projectile member moves away from the user.

9. The method of claim 1, wherein making contact comprises kicking the projectile member.

10. The method of claim 1, wherein the user avoids contact with the projectile member after making contact with the projectile member.

11. The method of claim 1, wherein the step of making the first contact comprises propelling the projectile member towards a target location.

12. The method of claim 1, wherein the step of making the first contact includes one of blocking, kicking, punching, striking, tagging and hitting the projectile member.

13. The method of claim 1, wherein the projectile member is a bean bag containing plastic pellets.

14. The method of claim 13, wherein the string is made of polyester material.

15. A method for improving coordination of a user using a training and coordination device, the method comprising the steps of:
providing a string formed of a first section and a second section having first and second ends respectively;
the first end of said first section associated with a first end of said string, and the second end of said first section terminating at a predetermined point spaced from the second end of said second section, said first section being formed of a single, uninterrupted strand portion having elasticity;
the second end of said second section associated with a second end of said string, said second section including a multi-strand portion, said multi-strand portion including at least three separate strands and having a length of about one to two feet, said first end of said multi-strand portion attaching to said second end of said single, uninterrupted strand portion;
attaching said first end of said string to a fixed location;
attaching said second end of said string to a projectile member;
freely suspending said projectile member from said fixed location;
determining which user body parts are can be contacted (allowed body parts) and which user body parts are to be avoided (non-allowed body parts) during the training;
assembling a plurality of users around the freely suspended projectile member;
one of said plurality of users making a first contact with the freely suspended projectile member using at least one allowable predetermined body part and avoiding contact with other, non-allowed body parts, wherein after the first contact is made by one of said plurality of users, said elasticity of said single strand portion and said at least three separate strands of said multistrand portion, produces said random motion in said projectile member; and
any one of said plurality of users making a second contact with the freely suspended projectile member and randomly moving said projectile member with at least one allowable predetermined body part while avoiding contact with the projectile member by any non-allowed body part in order to improve user coordination.

16. The method of claim 15, wherein the user makes contact with the projectile member while outside the circumference of a marked circle.

17. The method of claim 15, further comprising computing scores against users which comprise a count for any contact by a non-allowed body part of the user with the projectile member.

18. The method claim 15, wherein making contact with the training and coordination device using open hands is prohibited.

19. The method of claim 15, wherein the plurality of users are assembled in a circle around the training and coordination device.

20. The method of claim 19, further comprising stopping play when a user contacts the projectile member with a non-allowed body part, followed by the user who contacted the projectile member throwing the projectile member back into play.

21. The method of claim 15, further comprising the plurality of users moving in a predetermined direction each time a user makes contact with the projectile member using a non-allowed body part.

22. The method of claim 21, wherein the predetermined direction is one of a clockwise and counterclockwise direction.

23. The method of claim 15, wherein the step of making contact by a player comprises propelling the projectile member towards another player.

24. The method of claim 23, wherein each player attempts to avoid contact with the projectile member with non-allowed body parts and to make contact with the projectile member using an allowable body part when propelling the projectile member towards another player.

\* \* \* \* \*